(12) United States Patent
Wolf

(10) Patent No.: US 7,443,160 B2
(45) Date of Patent: Oct. 28, 2008

(54) POSITION SENSOR

(76) Inventor: Ronald J. Wolf, 51082 Stratford Ct., Elkhart, IN (US) 46514

( * ) Notice: Subject to any disclaimer, the term of this patent is extended or adjusted under 35 U.S.C. 154(b) by 0 days.

(21) Appl. No.: 11/529,173

(22) Filed: Sep. 28, 2006

(65) Prior Publication Data
US 2008/0079423 A1 Apr. 3, 2008

(51) Int. Cl.
*G01B 7/30* (2006.01)
*G01R 33/025* (2006.01)

(52) U.S. Cl. ............................ 324/207.25; 324/207.12

(58) Field of Classification Search ............ 324/207.21, 324/207.2, 207.24, 207.25, 207.12, 207.15, 324/207.16
See application file for complete search history.

(56) References Cited

U.S. PATENT DOCUMENTS

| | | | | |
|---|---|---|---|---|
| 4,914,389 A * | 4/1990 | Juds | ...................... | 324/207.21 |
| 5,602,681 A * | 2/1997 | Nakayama et al. | .......... | 359/698 |
| 6,018,241 A * | 1/2000 | White et al. | ............. | 324/207.2 |
| 6,152,172 A | 11/2000 | Christianson et al. | | |
| 6,400,142 B1 * | 6/2002 | Schroeder | .............. | 324/207.21 |
| 6,411,082 B2 * | 6/2002 | Glasson | ................. | 324/207.25 |
| 6,496,003 B1 * | 12/2002 | Okumura et al. | ....... | 324/207.24 |
| 6,823,725 B2 * | 11/2004 | Lohberg | ...................... | 73/116 |
| 7,197,974 B2 * | 4/2007 | Glasson | ........................ | 92/5 R |
| 2006/0170415 A1 * | 8/2006 | Budaker et al. | ........ | 324/207.13 |

* cited by examiner

*Primary Examiner*—Kenneth J Whittington
(74) *Attorney, Agent, or Firm*—Max Garwood

(57) ABSTRACT

A position sensor including a rotatable shaft, a first threaded member, a second threaded member, at least one magnet, and at least one magnetic flux detection device. The first threaded member is connected to the rotatable shaft. The second threaded member is threadably engaged with the first threaded member. The at least one magnet is connected to the second threaded member. The at least one magnetic flux detection device is positioned to detect a magnetic field from the at least one magnet.

24 Claims, 1 Drawing Sheet

POSITION SENSOR

BACKGROUND OF THE INVENTION

1. Field of the Invention

The present invention relates to a position sensor, and, more particularly, to a rotary position sensor.

2. Description of the Related Art

Electronic devices are an increasing part of everyday life and they are presently integrated in a large number of products, including products traditionally thought of as mechanical in nature, such as automobiles. To bridge the gap between mechanical movement and electronic control, it is necessary to successfully integrate electronic and mechanical components. This gap is normally bridged by using devices such as sensors and actuators.

Position sensors are used to electronically monitor the position or movement of a mechanical component. The position sensor produces data that may be expressed as an electrical signal that varies as the position of the mechanical component changes. Position sensors are an important part of innumerable products, providing the opportunity for intelligent control of a mechanical device.

Various contact-type sensors are known. For example, potentiometers are used, which detect a change in electrical signal due to a physical change in position of a wiping contact on an electrical resistive element. Rotational position movement can be detected by coupling a shaft of a potentiometer to the shaft of a rotating mechanical component. Linear movement can be detected either using a linear potentiometer or a rotating potentiometer that is coupled to a linear-moving component using pulleys and a string or a belt to translate a linear motion to rotational motion. A problem with this type of sensor is the physical wearing of the contacting parts. The wiping contact and the resistive element can cause a drift in the electrical signal, which induces errors and may lead to ultimate failure of the device.

Magnetic velocity sensors are generally a non-contact type of sensor and consist of a magnetic field sensing device, which is usually stationary, and a magnet is attached to a moving component. As the magnet approaches the sensing device, the magnetic field of the magnet is detected and the sensing device generates an electrical signal that is then used for counting, displaying, recording and/or control purposes.

What is needed in the art is a position sensor capable of sensing the position of a multi-turn device.

SUMMARY OF THE INVENTION

The present invention provides a multi-turn position sensor.

The invention comprises, in one form thereof, a position sensor including a rotatable shaft, a first threaded member, a second threaded member, at least one magnet, and at least one magnetic flux detection device. The first threaded member is connected to the rotatable shaft. The second threaded member is threadably engaged with the first threaded member. The at least one magnet is connected to the second threaded member. The at least one magnetic flux detection device is positioned to detect a magnetic field from the at least one magnet.

An advantage of the present invention is that multiple turns of a rotatable shaft, such as a steering wheel, are detectable by the present invention.

Another advantage of the present invention is that it includes a redundancy circuit system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates a preferred embodiment of the invention, and such exemplifications are not to be construed as limiting the scope of the invention in any manner.

DETAILED DESCRIPTION OF THE PRESENT INVENTION

Figure 2:
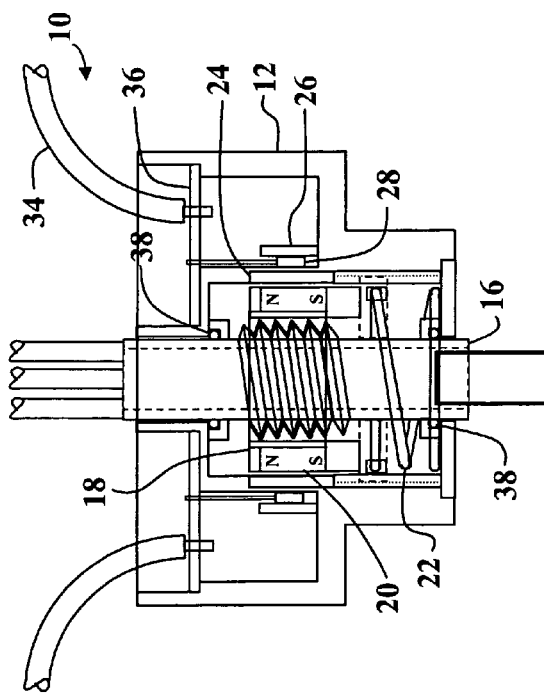
FIG. 2 is a schematical top-view of elements of the position sensor of FIG. 1.
Figure 1:
FIG. 1 is a cross-sectional view of an embodiment of the position sensor of the present invention.

Referring now to the drawings, and more particularly to FIGS. 1 and 2, there is shown an embodiment of a rotary position sensor 10 of the present invention. Rotary position sensor 10 includes a housing 12 and a steering shaft 14 interfacing with position sensor 10. Within housing 12 there is a threaded rotating member 16, a threaded non-rotating member 18, a magnet 20, a spring 22, a ferrous ring 24, a ferrous ring 26, magnetic flux detection devices 28, 30, and 32, conductors 34, signal conditioning circuits 36, and O-rings 38. Ferrous ring 24 is optional and is not necessary for the present invention to function. Ferrous ring 24 serves to average the magnetic field of magnet 20, which may not be required since magnet 20 does not rotate.

Housing 12 is shown schematically and has mounting tabs, not shown, to position and hold housing 12 in a stable position. Steering shaft 14 is for illustrative purposes and may represent any rotating shaft that is constrained to a predefined number of rotations. Threaded rotating member 16 is connected to steering shaft 14. Steering shaft 14 may continue completely through threaded rotating member 16, which is shown as a hollow member. Threaded rotating member 16 is constrained to not move in a longitudinal direction as it is rotated. Threaded rotating member 16 is threadingly engaged with threaded non-rotating member 18. Non-rotating member 18 is constrained from rotating by a protrusion extending into a channel of housing 12 or some other suitable method.

Threaded non-rotating member 18 moves longitudinally as threaded rotating member 16 is rotated due to the interaction of the threads on members 16 and 18. Magnet 20 is attached to threaded non-rotating member 18 so that magnet 20 moves in a longitudinal direction as steering shaft 14 and threaded rotating member 16 rotate around the longitudinal axis thereof. Although magnet 20 is illustrated as a single ring magnet for the sake of clarity, three separate magnets located proximate to corresponding magnetic flux detection device 28, 30, and 32 is also contemplated in the present invention. Threaded non-rotating member 18 may be an injection-molded device containing multiple magnets 20.

Spring 22 serves as a biasing device to ensure that threaded non-rotating member 18 and threaded rotating member 16 are constantly engaged on one portion of the threads between members 16 and 18. Spring 22 serves as a biasing device that reduces or eliminates hysteresis between the rotation of steering shaft 14 and the output of position sensor 10.

Ferrous ring 24 serves to average the magnetic field from magnet 20, particularly if the field form magnet 20 has some non-uniformity. Again, while ferrous ring 24 may be thought of as a ring, individual ferrous pieces placed proximate to each of magnetic flux detection devices 28, 30, and 32 is also contemplated in the present invention. Ferrous ring 24 may be shaped, such as in a concave or convex shape, so as to alter the magnetic field detected by magnetic flux detection devices 28, 30 and 32. Ferrous ring 26 on an outside perimeter of devices 28, 30, and 32 serves to direct the magnetic field of magnet 20 and reduce the effect of outside magnetic fields on devices 28, 30, and 32. Additionally, housing 12 may be of a material that reduces the influence of any outside magnetic field from altering the performance of position sensor 10.

Magnetic flux detection devices 28, 30, and 32 may be a Hall device 28, 30, or 32. Hall devices 28, 30, and 32 are arranged geometrically at predefined locations, which may be the same distance from the longitudinal axis. The separate positioning and use of a plurality of Hall devices allows for interaction with circuits 36, which can utilize a majority voting system to determine if there is an error in one of the signals from a Hall device. The advantage of a multiple redundancy use of Halls allows circuit 36 to include a comparison circuit that compares the electrical output from the Hall devices to determine if one of the Hall devices has an output that varies more than a predetermined amount from the output of the other two Hall devices. In a like manner, more than three Hall devices may be utilized for more sophisticated error-reducing techniques. The output position sensor 10 can be an average of Hall devices 28, 30, and 32, thereby reducing any variation that may be detected. Conductors 34 provide power and a path for the transmission of information from position sensor 10 to a computing unit, not shown.

O-rings 38 are positioned to seal rotating member 16 so as to reduce or prevent the introduction of moisture and debris into the interior of housing 12.

Figure 3:
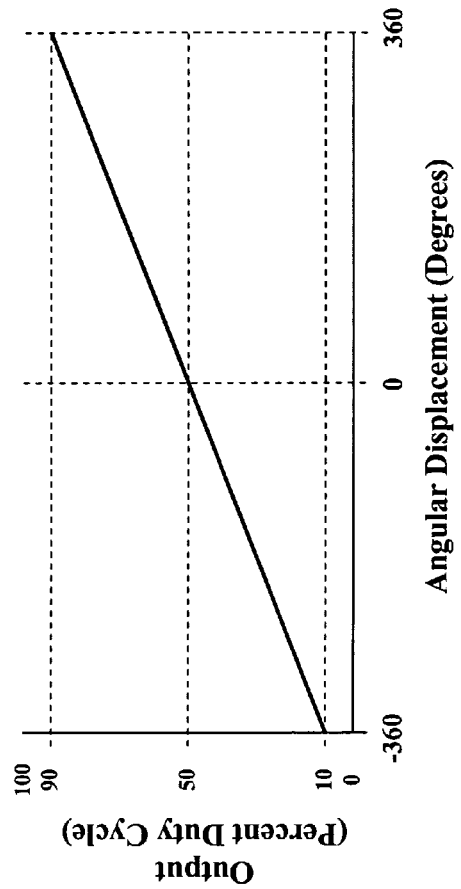
FIG. 3 is an illustrated figure showing an electrical output for a two-turn system of the position sensor of FIGS. 1 and 2.

Now, additionally referring to FIG. 3, there is shown an output curve illustrating a plus and minus 360° rotation of threaded rotating member 16 relative to position sensor housing 12. The output from position sensor 10 corresponds in a direct manner to the rotational position of steering shaft 14. Although FIG. 3 illustrates a two-rotation position sensor 10, the geometry of magnets 20 and the threads upon members 16 and 18 can be altered to change the sensing capability to more or less than two turns. Position sensor 10 is limited in the number of rotations in which sensing can be accomplished due to the geometrical considerations of the construct. As such, a continuous rotating shaft cannot be utilized for the measurement of the absolute position thereof.

The electrical outputs from sensor 10 may include analog, linear, pulse width modulated, digital or other formats.

Although the present invention is illustrated using three Hall devices, it should be understood that the same principle can be utilized using a single Hall device for less critical operations than the steering position of an automobile. Also, the illustration shows a hollow, threaded rotating member 16. It is also anticipated that rotating member 16 may be solid or may be open longitudinally for the insertion of a shaft into the middle of position sensor 10 so that position sensor 10 may be inserted over a steering shaft 14 to thereby enhance the application of position sensor 10 for many applications.

Also contemplated is a construct in which magnet 20 is moved in a linear direction by a connection of magnet 20 to member 18, which would move in a linear manner without attachment to rotational member 16. Member 18 can be biased by a spring in a manner similar to that described above.

While this invention has been described with respect to preferred embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A position sensor, comprising:
   a rotatable shaft having a longitudinal axis;
   a first threaded member connected to said rotatable shaft;
   a second threaded member threadably engaged with said first threaded member;
   at least one magnet connected to said second threaded member;
   at least one magnetic flux detection device positioned to detect a magnetic field from said
   at least one magnet; and
   a ferrous ring, said at least one magnet being positioned radially outwardly from said longitudinal axis, said ferrous ring being positioned radially outwardly from said at least one magnet and said longitudinal axis, said at least one magnetic flux detection device being positioned radially outwardly from said ferrous ring.

2. The position sensor of claim 1, further comprising a housing, said at least one magnetic flux detection device connected to a portion of said housing.

3. The position sensor of claim 2, wherein said first threaded member is rotatable about a longitudinal axis that defines a longitudinal direction, said first threaded member being substantially constrained from movement longitudinally along said axis.

4. The position sensor of claim 3, wherein said first threaded member has a substantially cylindrical hollow interior.

5. The position sensor of claim 3, wherein said second threaded member is substantially constrained from rotating, said second threaded member being movable in said longitudinal direction.

6. The position sensor of claim 5, wherein rotation of said first threaded member causes said second threaded member to move in said longitudinal direction.

7. The position sensor of claim 6, further comprising a biasing member placing a biasing force on said second threaded member in said longitudinal direction.

8. The position sensor of claim 7, wherein said at least one magnet has a magnetic axis that is a least approximately parallel with said longitudinal axis.

9. The position sensor of claim 8, wherein said at least one magnetic flux detection device includes a first magnetic flux detection device and a second magnetic flux detection device, said first magnetic flux detection device and said second magnetic flux detection device being located substantially the same distance from said longitudinal axis.

10. The position sensor of claim 9, further comprising a comparison circuit that compares an electrical output from said first magnetic flux detection device with an electrical output from said second magnetic flux detection device.

11. The position sensor of claim 10, wherein said at least one magnetic flux detection device further includes a third magnetic flux detection device, said comparison circuit comparing electrical outputs from said first magnetic flux detection device, said second magnetic flux detection device, and said third magnetic flux detection devices.

12. The position sensor of claim 11, wherein said comparison circuit outputs an error signal if one of said first magnetic flux detection device, said second magnetic flux detection device, and said third magnetic flux detection device has an output that varies more than a predetermined amount from an output of the other magnetic flux detection devices.

13. A position sensor, comprising:
a first threaded member having a longitudinal axis;
a second threaded member threadably engaged with said first threaded member;
at least one magnet connected to said second threaded member;
at least one magnetic flux detection device positioned to detect a magnetic field from said
at least one magnet; and
a ferrous ring, said at least one magnet being positioned radially outwardly from said longitudinal axis, said ferrous ring being positioned radially outwardly from said at least one magnet and said longitudinal axis, said at least one magnetic flux detection device being positioned radially outwardly from said ferrous ring.

14. The position sensor of claim 13, further comprising a housing, said at least one magnetic flux detection device connected to a portion of said housing.

15. The position sensor of claim 14, wherein said first threaded member is rotatable about a longitudinal axis that defines a longitudinal direction, said first threaded member being substantially constrained from movement longitudinally along said axis.

16. The position sensor of claim 15, wherein said first threaded member has a substantially cylindrical hollow interior.

17. The position sensor of claim 15, wherein said second threaded member is substantially constrained from rotating, said second threaded member being movable in said longitudinal direction.

18. The position sensor of claim 17, wherein rotation of said first threaded member causes said second threaded member to move in said longitudinal direction.

19. The position sensor of claim 18, further comprising a biasing member placing force on said second threaded member in said longitudinal direction.

20. The position sensor of claim 19, wherein said at least one magnet has a magnetic axis that is at least approximately parallel with said longitudinal axis.

21. The position sensor of claim 20, wherein said at least one magnetic flux detection includes a first magnetic flux detection device and a second magnetic flux detection device, said first magnetic flux detection device and said second magnetic flux detection device being located substantially the same distance from said longitudinal axis.

22. The position sensor of claim 21, further comprising a comparison circuit that compares an electrical output from said first magnetic flux detection device with an electrical output from said magnetic flux detection device.

23. The position sensor of claim 22, wherein said at least one magnetic flux detection device further includes a third magnetic flux detection device, said comparison circuit comparing electrical outputs from said first magnetic flux detection device, said second magnetic flux detection device, and said third magnetic flux detection devices.

24. The position sensor of claim 23, wherein said comparison circuit outputs an error signal if one said first magnetic flux detection device, said second magnetic flux detection device, and said third magnetic flux detection device has an output that varies more than a predetermined amount from an output of the other magnetic flux detection devices.

* * * * *